US009028197B2

(12) United States Patent
Furuichi et al.

(10) Patent No.: US 9,028,197 B2
(45) Date of Patent: May 12, 2015

(54) ROBOT WITH PLURALITY OF BELTS AND INTERMEDIATE PULLEY

(71) Applicant: Kabushiki Kaisha Yaskawa Denki, Fukuoka (JP)

(72) Inventors: Masatoshi Furuichi, Fukuoka (JP); Osamu Komiyaji, Fukuoka (JP); Masayuki Suzuki, Fukuoka (JP); Hiroki Sanemasa, Fukuoka (JP)

(73) Assignee: Kabushiki Kaisha Yaskawa Denki, Kitakyushu-Shi, Fukuoka (JP)

( * ) Notice: Subject to any disclaimer, the term of this patent is extended or adjusted under 35 U.S.C. 154(b) by 215 days.

(21) Appl. No.: 13/739,271

(22) Filed: Jan. 11, 2013

(65) Prior Publication Data

US 2013/0195600 A1 Aug. 1, 2013

(30) Foreign Application Priority Data

Feb. 1, 2012 (JP) .................................. 2012-020239

(51) Int. Cl.
| | | |
|---|---|---|
| B25J 9/10 | (2006.01) | |
| B25J 18/04 | (2006.01) | |
| B25J 19/00 | (2006.01) | |
| B25J 9/04 | (2006.01) | |

(52) U.S. Cl.
CPC .............. *B25J 18/04* (2013.01); *B25J 19/0066* (2013.01); *B25J 9/1045* (2013.01); *B25J 9/043* (2013.01); *B25J 9/104* (2013.01)

(58) Field of Classification Search
CPC ....... B25J 19/0066; B25J 9/043; B25J 9/1045
USPC ..................................................... 414/744.5
See application file for complete search history.

(56) References Cited

U.S. PATENT DOCUMENTS

| | | | |
|---|---|---|---|
| 8,573,919 B2 * | 11/2013 | Gilchrist et al. ............ 414/744.5 |
| 2003/0011338 A1 * | 1/2003 | Gilchrist ................... 318/568.21 |
| 2005/0079042 A1 * | 4/2005 | Maeda ......................... 414/744.2 |
| 2011/0262257 A1 * | 10/2011 | Hino ........................... 414/744.5 |
| 2012/0293026 A1 | 11/2012 | Nakao et al. |

FOREIGN PATENT DOCUMENTS

| | | |
|---|---|---|
| CN | 1617789 A | 5/2005 |
| CN | 102233577 A | 11/2011 |

(Continued)

OTHER PUBLICATIONS

Taiwanese Office Action dated Aug. 25, 2014 issued in corresponding Taiwanese application No. 101150142 and the English translation thereof.
Korean Office Action dated Oct. 20, 2014 issued in corresponding Korean application No. 10-2013-0001905 and the English translation thereof.
Korean Office Action dated Aug. 25, 2014 issued in corresponding Korean application No. 10-2013-0001905 and the English translation thereof.

(Continued)

*Primary Examiner* — Gerald McClain
(74) *Attorney, Agent, or Firm* — Bacon & Thomas, PLLC

(57) ABSTRACT

A robot includes an arm having a base end portion rotatably installed through a joint part and a tip end portion in which an output shaft is installed; and a drive mechanism arranged within the arm and configured to drive the output shaft at a reduced speed. The drive mechanism includes a motor having a motor shaft, a driving pulley attached to the motor shaft, a driven pulley attached to the output shaft, at least one intermediate pulley provided between the driving pulley and the driven pulley, and a plurality of belts for operatively interconnecting the driving pulley and the driven pulley through the intermediate pulley.

8 Claims, 7 Drawing Sheets

(56) References Cited

FOREIGN PATENT DOCUMENTS

| | | | | | |
|---|---|---|---|---|---|
| JP | S60-48284 | A | | 3/1985 | |
| JP | 2001-113489 | A | | 4/2001 | |
| JP | 2003-170384 | A | | 6/2003 | |
| JP | 2003170384 | A | * | 6/2003 | ............... B25J 19/00 |
| JP | 2009-058870 | A | | 3/2009 | |
| JP | 2011-000659 | A | | 1/2011 | |
| JP | 2011000659 | A | * | 1/2011 | |
| JP | 2011-224743 | | | 11/2011 | |
| TW | 201139250 | A1 | | 11/2011 | |

OTHER PUBLICATIONS

Chinese Office Action dated Sep. 18, 2014 issued in corresponding Chinese application No. 201210592401.1 and the English translation thereof.

Japanese Office Action dated Jan. 7, 2014 issued in corresponding Japanese application No. 2012-020239 and the English translation thereof.

Korean Office Action dated Feb. 7, 2014 issued in corresponding Korean application No. 10-2013-0001905 and the English translation thereof.

* cited by examiner

ROBOT WITH PLURALITY OF BELTS AND INTERMEDIATE PULLEY

CROSS-REFERENCE TO RELATED APPLICATION

The present disclosure contains subject matter related to that disclosed in Japanese Priority Patent Application No. 2012-020239 filed on Feb. 1, 2012. The contents of this application are incorporated herein by reference in their entirety.

BACKGROUND OF THE INVENTION

1. Field of the Invention

Embodiments disclosed herein relate to a robot.

2. Description of the Related Art

Conventionally, a so-called horizontal articulated robot is known as a robot for transferring a substrate such as a semiconductor wafer or the like. In the horizontal articulated robot, a hand serving as an end effecter is installed in the tip end portion of a swingable arm so as to horizontally rotate with respect to the arm. The hand is capable of holding a substrate (see, e.g., Japanese Patent Application Publication No. 2011-224743).

In the robot of this type, a hand drive mechanism for driving the hand is usually arranged within a housing of the arm. For example, a speed reduction device employing a gear mechanism such as a Harmonic Drive (registered trademark) speed reduction mechanism is generally used as the hand drive mechanism.

However, if the conventional speed reduction device employing the gear mechanism is used as the hand drive mechanism as in the conventional configuration stated above, the weight of the arm gets increased. Moreover, it becomes difficult to make the arm slim.

SUMMARY OF THE INVENTION

In accordance with an aspect of the embodiment, there is provided a robot, including: an arm having a base end portion rotatably installed through a joint part and a tip end portion in which an output shaft is installed; and a drive mechanism arranged within the arm and configured to drive the output shaft at a reduced speed, wherein the drive mechanism includes a motor having a motor shaft, a driving pulley attached to the motor shaft, a driven pulley directly attached to the output shaft, at least one intermediate pulley provided between the driving pulley and the driven pulley, and a plurality of belts for operatively interconnecting the driving pulley and the driven pulley through the intermediate pulley.

DESCRIPTION OF THE EMBODIMENTS

Hereinafter, embodiments of a robot will now be described in detail with reference to the accompanying drawings which form a part hereof. While a horizontal articulated robot will be described below as one example of the robot, the present invention is not limited to the embodiments to be described below.

Figure 1:
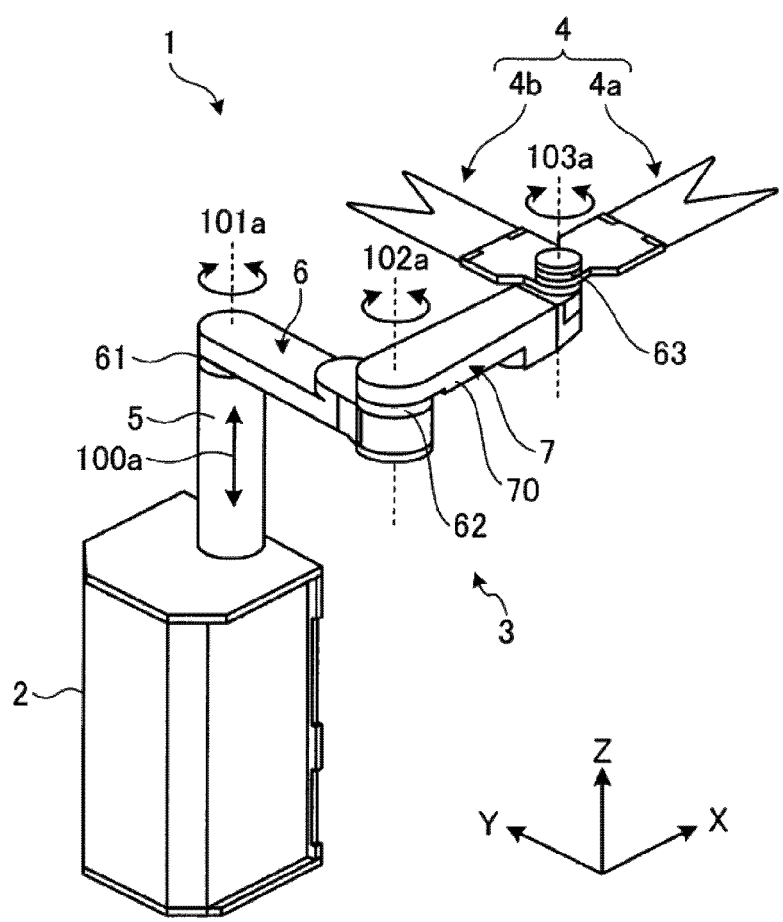
FIG. 1 is a schematic explanatory view showing a robot according to an embodiment.

First, the schematic configuration of a horizontal articulated robot (hereinafter simply referred to as "robot 1") according to one embodiment will be described with reference to FIG. 1. FIG. 1 is a schematic explanatory view showing a robot 1 according to the present embodiment.

In the following description, it is sometimes the case that the relative positional relationship of the respective components of the robot 1 are defined by an up-down direction, a left-right direction, a front-rear direction, a front direction and an inward direction. In this case, the Z-direction in the three-dimensional rectangular coordinate system shown in FIG. 1 will be referred to as an upward direction, the X-direction as a horizontal right direction and the Y-direction as an inward direction.

Referring to FIG. 1, the robot 1 according to the present embodiment includes a base unit 2 installed on a specified installation surface such as a floor surface or the like and an arm unit 3 installed to horizontally rotate with respect to the base unit 2. The arm unit 3 is provided at its tip end with a hand unit 4 rotatable in the horizontal direction.

The base unit 2 is a base of the robot 1 and is formed into a vertically-elongated box-like shape. A lift mechanism (not shown) for driving a lift unit 5 that moves the arm unit 3 up and down is arranged within the base unit 2. For example, a well-known mechanism employing a motor and a ball screw can be used as the lift mechanism.

The arm unit 3 is installed to be slidable in the vertical direction (the Z-direction) with respect to the upper surface of the base unit 2 by way of the lift unit 5 formed into a columnar shape (see a double-headed arrow 100a in FIG. 1).

The arm unit 3 includes a first arm 6 and a second arm 7. The first arm 6 has a base end portion installed on the upper end of the lift unit 5 to be rotatable about a first-arm pivot shaft of a first joint part 61. The second arm 7 has a base end portion installed on a tip end portion of the first arm 6 to be rotatable about a second-arm pivot shaft of a second joint part 62.

The hand unit 4 is installed on a tip end portion of the second arm 7 to be rotatable about a hand pivot shaft 103 (see FIGS. 2, 3 and 5) of a third joint part 63. In FIG. 1, reference symbol 101a designates a center axis of the first joint part 61. Reference symbol 102a designates a center axis of the second joint part 62. Reference symbol 103a designates a center axis of the third joint part 63 (the hand pivot shaft 103).

The hand unit 4 is an end effecter for holding, e.g., a wafer. The hand unit 4 includes a first hand 4a and a second hand 4b, both of which are formed into a fork shape.

The first hand 4a and the second hand 4b are installed in a spaced-apart relationship along the hand pivot shaft 103 serving as an output shaft. In other words, the first hand 4a and the second hand 4b are installed in a vertically overlapping state along the hand pivot shaft 103 so as to be independently rotatable within a specified rotation extent.

The first hand 4a and the second hand 4b can rotate in the horizontal direction but cannot rotate limitlessly. There are provided stopper mechanisms (not shown) for limiting the rotations of the first hand 4a and the second hand 4b to necessary rotation amounts, respectively. Well-known stopper mechanisms may be appropriately employed as the stopper mechanisms.

Sensors for detecting, e.g., the presence or absence of substrates placed on the first hand 4a and the second hand 4b are installed in the first hand 4a and the second hand 4b. Cables 11a and 11b are connected to the sensors. The cables 11a and 11b extend into the base unit 2 through the inside of the second arm 7 and the first arm 6 (see FIG. 3).

As shown in FIG. 1, the first hand 4a and the second hand 4b have the same configuration. Alternatively, the first hand 4a and the second hand 4b may have different configurations. In the present embodiment, the hand unit 4 is configured to include two hands, but the number of the hands is not limited thereto.

The robot 1 is installed in, e.g., a substrate transfer system (not shown) and can be appropriately used in transferring a substrate such as a wafer or the like. The substrate transfer system is installed side by side with a processing apparatus for subjecting a substrate to, e.g., cleaning, etching, asking, chemical vapor deposition or exposure. Needless to say, a plurality of robots 1 may be installed at different points so as to transfer a plate-like member such as a substrate or the like between desired positions.

Next, a hand drive mechanism 8 as one major part of the robot 1 of the present embodiment will be described with reference to FIGS. 2 through 6B.

Figure 2:
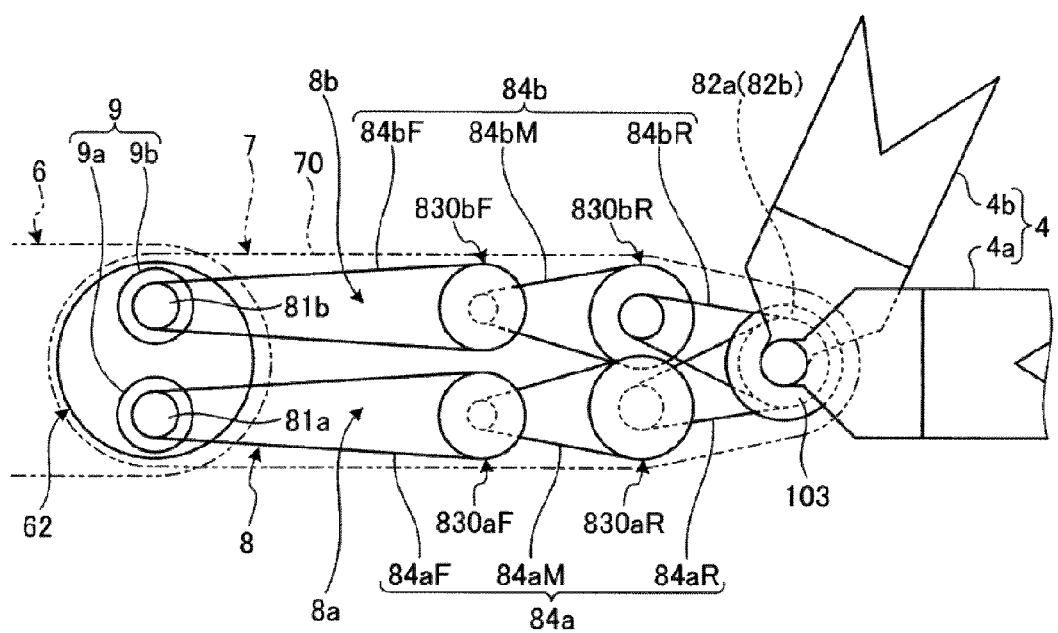
FIG. 2 is a schematic explanatory plan view showing an arm of the robot.

As shown in FIG. 2, the hand drive mechanism 8 of the present embodiment is a drive mechanism for driving the hand pivot shaft 103 as the aforementioned output shaft at a reduced speed. A first motor 9a and a second motor 9b are used as a drive power source 9 for the hand drive mechanism 8. The hand drive mechanism 8 is arranged within an arm housing 70 of the second arm 7.

Figure 3:
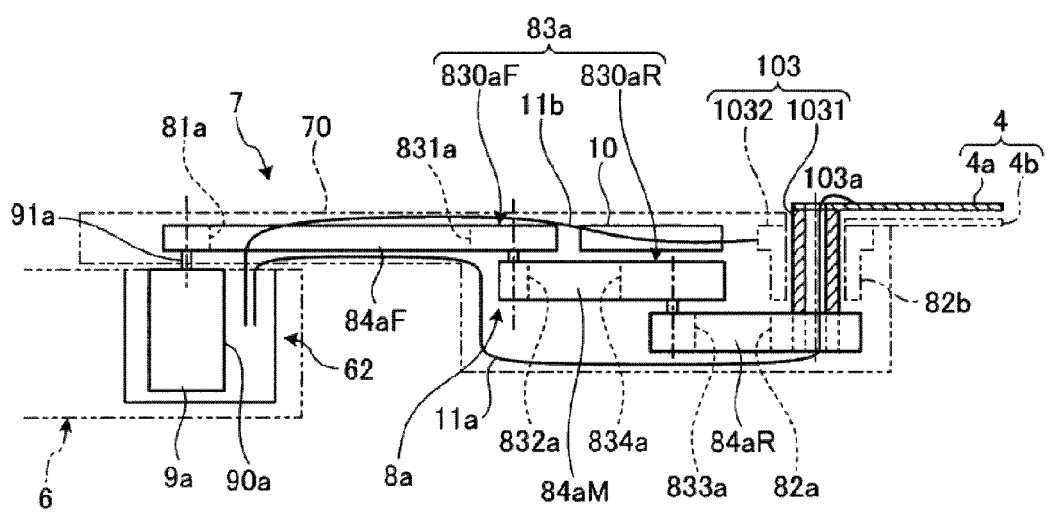
FIG. 3 is a schematic explanatory vertical section view showing a first drive mechanism of the arm of the robot.

As shown in FIGS. 2 and 3, the hand pivot shaft 103 of the present embodiment includes a first hand pivot shaft 1031 to which the first hand 4a is connected and a second hand pivot shaft 1032 to which the second hand 4b is connected.

In other words, as shown in FIG. 3, the first hand pivot shaft 1031 formed into a tubular shape is inserted into the second hand pivot shaft 1032 formed into a tubular shape with an inner diameter larger than the outer diameter of the first hand pivot shaft 1031. The first hand pivot shaft 1031 and the second hand pivot shaft 1032 have a common center axis 103a.

As shown in FIG. 2, the hand drive mechanism 8 includes a first drive mechanism 8a corresponding to the first hand 4a and a second drive mechanism 8b corresponding to the second hand 4b.

More specifically, as shown in FIGS. 2 and 3, the first drive mechanism 8a includes a first motor 9a, a first driving pulley 81a attached to a first drive shaft 91a as a motor shaft of the first motor 9a, and a first driven pulley 82a having a specified speed reduction ratio, which is directly attached to the first hand pivot shaft 1031. The first drive mechanism 8a further includes at least one first intermediate pulley 83a having a specified speed reduction ratio, which is arranged between the first driving pulley 81a and the first driven pulley 82a, and a plurality of first belts 84a for operatively interconnecting the first driving pulley 81a and the first driven pulley 82a through the first intermediate pulley 83a.

Figure 4A:
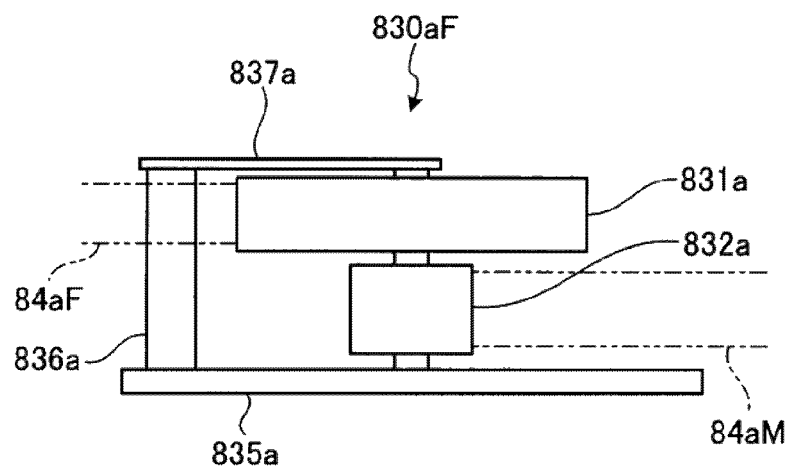
FIG. 4A is a schematic explanatory view showing a first front-end intermediate pulley of the first drive mechanism.
Figure 4B:
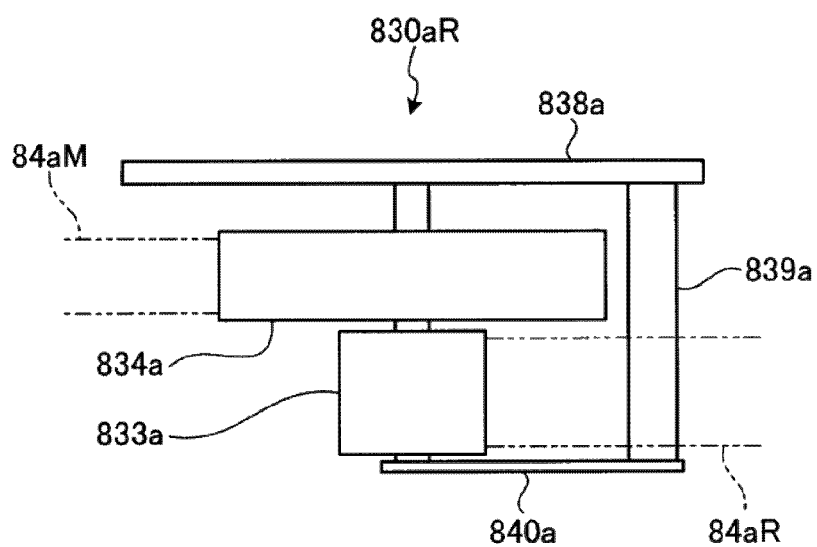
FIG. 4B is a schematic explanatory view showing a first rear-end intermediate pulley of the first drive mechanism.

As shown in FIGS. 2 and 3, the first intermediate pulley 83a of the first drive mechanism 8a includes a first front-end intermediate pulley 830aF (see FIG. 4A) and a first rear-end intermediate pulley 830aR (see FIG. 4B). A first driving intermediate pulley 831a (to be described later) of the first front-end intermediate pulley 830aF has a diameter larger than the diameter of the first driving pulley 81a and has a specified speed reduction ratio with respect to the first driving pulley 81a. The first rear-end intermediate pulley 830aR has a diameter larger than the diameter of the first front-end intermediate pulley 830aF and has a specified speed reduction ratio with respect to the first front-end intermediate pulley 830aF. The first driven pulley 82a has a diameter larger than the diameter of the first rear-end intermediate pulley 830aR and has a specified speed reduction ratio with respect to the first rear-end intermediate pulley 830aR.

As shown in FIG. 4A, the first front-end intermediate pulley 830aF includes the first driving intermediate pulley 831a operatively connected to the first driving pulley 81a through a first front-end power-transmitting belt 84aF and a first driving sub-pulley 832a having a diameter smaller than the diameter of the first driving intermediate pulley 831a, the first driving intermediate pulley 831a and the first driving sub-pulley 832a being attached a same shaft.

As shown in FIG. 4A, the first driving intermediate pulley 831a and the first driving sub-pulley 832a of the first front-end intermediate pulley 830aF are arranged between a first driving-side base plate 835a and a first driving-side support plate 837a connected to the first driving-side base plate 835a through a first driving-side connecting member 836a. The first driving intermediate pulley 831a and the first driving sub-pulley 832a are arranged on the same shaft in a mutually-adjoining and vertically-overlapping relationship.

As shown in FIG. 4B, the first rear-end intermediate pulley 830aR includes a first driven sub-pulley 834a operatively connected to the first driving sub-pulley 832a of the first front-end intermediate pulley 830aF through a first intermediate power-transmitting belt 84aM. The first rear-end intermediate pulley 830aR further includes a first driven intermediate pulley 833a having a diameter smaller than the diameter of the first driven sub-pulley 834a. The first driven intermediate pulley 833a and the first driven sub-pulley 834a are attached to a same shaft and the first driven intermediate pulley 833a is operatively connected to the first driven pulley 82a through a first rear-end power-transmitting belt 84aR.

As shown in FIG. 4B, the first driven intermediate pulley 833a and the first driven sub-pulley 834a of the first rear-end intermediate pulley 830aR are arranged between a first driven-side base plate 838a and a first driven-side support plate 840a connected to the first driven-side base plate 838a through a first driven-side connecting member 839a. The first driven intermediate pulley 833a and the first driven sub-pulley 834a are arranged on the same shaft in a mutually-adjoining and vertically-overlapping relationship.

Figure 5:
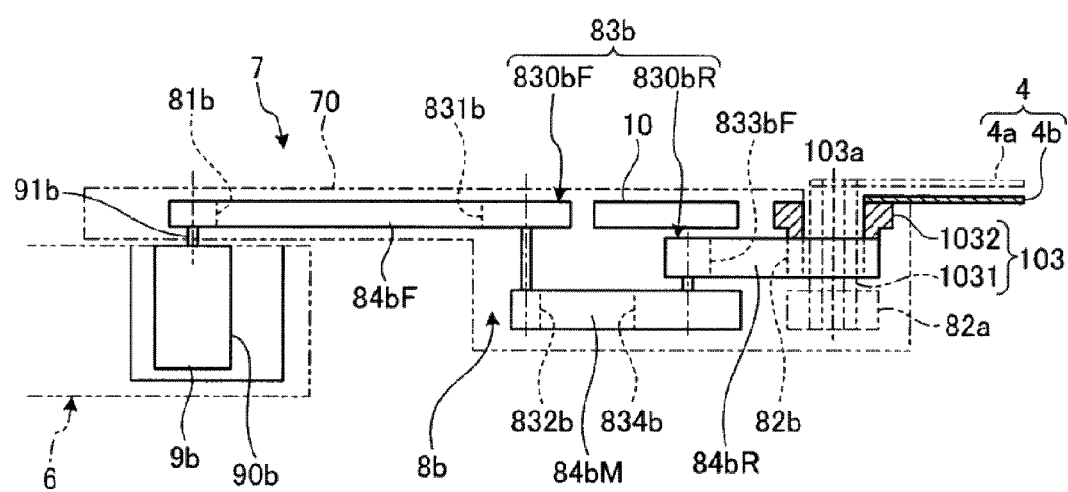
FIG. 5 is a schematic explanatory vertical section view showing a second drive mechanism of the arm of the robot.

As shown in FIGS. 2 and 5, the second drive mechanism 8b includes a second motor 9b installed side by side with the first motor 9a in the transverse direction and a second driving pulley 81b attached to a second driving shaft 91b as a motor shaft of the second motor 9b. The second drive mechanism 8b further includes a second driven pulley 82b having a specified speed reduction ratio, which is directly attached to the second hand pivot shaft 1032. The second drive mechanism 8b further includes at least one second intermediate pulley 83b having a specified speed reduction ratio, which is arranged between the second driving pulley 81b and the second driven pulley 82b, and a plurality of second belts 84b for operatively interconnecting the second driving pulley 81b and the second driven pulley 82b through the second intermediate pulley 83b.

The second intermediate pulley 83b of the second drive mechanism 8b includes a second front-end intermediate pulley 830bF (see FIG. 6A) and a second rear-end intermediate pulley 830bR (see FIG. 63). A second driving intermediate pulley 831b (to be described later) of the second front-end intermediate pulley 830bF has a diameter larger than the diameter of the second driving pulley 81b and has a specified speed reduction ratio with respect to the second driving pulley 81b. The second rear-end intermediate pulley 830bR has a diameter larger than the diameter of the second front-end intermediate pulley 830bF and has a specified speed reduction ratio with respect to the second front-end intermediate pulley 830bF. The second driven pulley 82b has a diameter larger than the diameter of the second rear-end intermediate pulley 830bR and has a specified speed reduction ratio with respect to the second rear-end intermediate pulley 830bR.

Figure 6A:
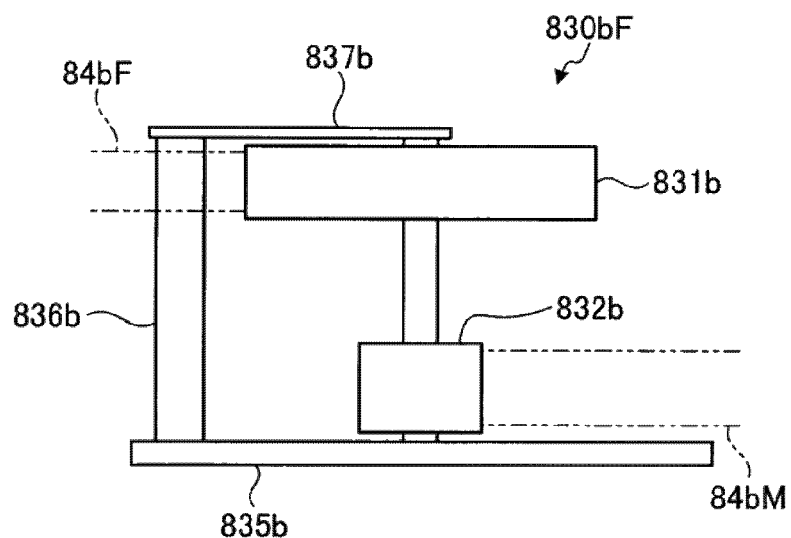
FIG. 6A is a schematic explanatory view showing a second front-end intermediate pulley of the second drive mechanism.

As shown in FIG. 6A, the second front-end intermediate pulley 830bF includes the second driving intermediate pulley 831b operatively connected to the second driving pulley 81b through a second front-end power-transmitting belt 84bF, and a second driving sub-pulley 832b attached to the shaft of the second driving intermediate pulley 831b.

As shown in FIG. 6A, the second driving intermediate pulley 831b and the second driving sub-pulley 832b of the second front-end intermediate pulley 830bF are arranged between a second driving-side base plate 835b and a second driving-side support plate 837b connected to the second driving-side base plate 835b through a second driving-side connecting member 836b. The second driving intermediate pulley 831b and the second driving sub-pulley 832b are arranged on the same shaft in an overlapping relationship and are spaced apart from each other by a distance larger than the distance between the first driving intermediate pulley 831a and the first driving sub-pulley 832a of the first front-end intermediate pulley 830aF.

Figure 6B:
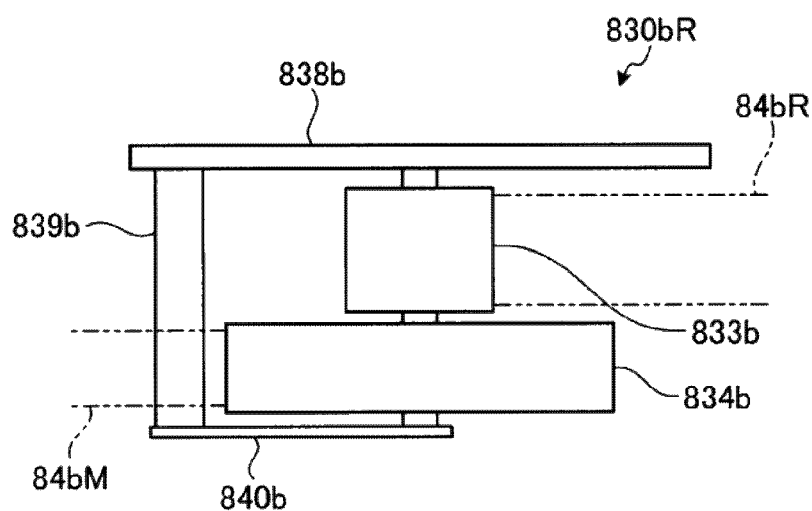
FIG. 6B is a schematic explanatory view showing a second rear-end intermediate pulley of the second drive mechanism.

As shown in FIG. 6B, the second rear-end intermediate pulley 830bR includes a second driven sub-pulley 834b operatively connected to the second driving sub-pulley 832b of the second front-end intermediate pulley 830bF through a second intermediate power-transmitting belt 84bM. The second rear-end intermediate pulley 830bR further includes a second driven intermediate pulley 833b having a diameter smaller than the diameter of the second driven sub-pulley 834b. The second driven intermediate pulley 833b is attached to the shaft of the second driven sub-pulley 834b and is operatively connected to the second driven pulley 82b through a second rear-end power-transmitting belt 84bR.

As shown in FIG. 6B, the second driven intermediate pulley 833b and the second driven sub-pulley 834b of the second rear-end intermediate pulley 830bR are arranged between a second driven-side base plate 838b and a second driven-side support plate 840b connected to the second driven-side base plate 838b through a second driven-side connecting member 839b. The second driven intermediate pulley 833b and the second driven sub-pulley 834b are arranged on the same shaft in a mutually-adjoining and overlapping relationship.

In the robot 1 according to the present embodiment, the hand drive mechanism 8 for driving the first hand 4a and the second hand 4b with specified torque is arranged within the arm housing 70 of the second arm 7.

Unlike the conventional configuration, the hand drive mechanism 8 does not employ a speed reduction device that makes use of a gear mechanism. In other words, the speed reduction mechanism of the hand drive mechanism 8 includes the pulleys and the belts which are lighter than the conventional gear mechanism. Accordingly, it is possible for the robot 1 of the present embodiment to reduce the weight of the second arm 7.

In the hand drive mechanism 8 of the present embodiment, as can be noted from FIGS. 3 to 6B, the first driving intermediate pulley 831a and the second driving intermediate pulley 831b of the first front-end intermediate pulley 830aF and the second front-end intermediate pulley 830bF are arranged at the same height. The first front-end intermediate pulley 830aF and the second front-end intermediate pulley 830bF are arranged in the same vertical orientation. The first rear-end intermediate pulley 830aR and the second rear-end intermediate pulley 830bR are arranged in the opposite vertical orientations.

In other words, the first driven sub-pulley 834a is positioned at the upper side and the second driven sub-pulley 834b is positioned at the lower side. The first driven sub-pulley 834a and the second driven sub-pulley 834b are arranged to partially overlap with each other when seen in a plan view (see FIG. 2).

Therefore, the first driving sub-pulley 832a arranged just below and adjacent to the first driving intermediate pulley 831a and the first driven sub-pulley 834a of the first rear-end intermediate pulley 830aR are operatively connected to each other without hindrance through the horizontally-wound first intermediate power-transmitting belt 84aM. Similarly, the second driving sub-pulley 832b arranged below and spaced apart from the second driving intermediate pulley 831b and the second driven sub-pulley 834b of the second rear-end intermediate pulley 830bR are operatively connected to each other without hindrance through the horizontally-wound second intermediate power-transmitting belt 84bM.

In this manner, the first driving pulley 81a and the second driving pulley 81b arranged at the same height in the vertical direction can be operatively connected, with no hindrance, to the first driven pulley 82a and the second driven pulley 82b arranged at different heights in the vertical direction, by virtue of the first intermediate pulley 83a, the second intermediate pulley 83b, the horizontally-wound first belts 84a and the horizontally-wound second belts 84b.

In the first motor 9a and the second motor 9b of the hand drive mechanism 8 according to the present embodiment, the motor base end portions 90a and 90b are arranged within the first arm 6. The upper portions of the first and second drive shafts 91a and 91b extend into the arm housing 70 of the second arm 7.

In the hand drive mechanism 8 according to the present embodiment, the first hand pivot shaft 1031 is inserted into the second hand pivot shaft 1032 having a tubular shape. The first hand pivot shaft 1031 and the second hand pivot shaft 1032 share the same center axis 103a with each other. The first motor 9a and the second motor 9b are installed side by side in the transverse direction of the second arm 7.

With this configuration, it is possible to reduce the thickness of the arm housing 70 of the second arm 7 and to make the arm housing 70 slim in the transverse direction, which assists in reducing the size and weight of the second arm 7. In particular, since the motor base end portions 90a and 90b of the first motor 9a and the second motor 9b are arranged within the first arm 6, it is possible to reduce the thickness of the base end portion of the second arm 7.

If there is no need to reduce the thickness of the arm housing 70, the motor base end portions 90a and 90b of the first motor 9a and the second motor 9b need not be necessarily arranged within the first arm 6. In other words, the first motor 9a and the second motor 9b may be arranged within the second arm 7.

The first and second motors 9a and 9b mounted with the first and second driving pulleys 81a and 81b, the first and second front-end intermediate pulleys 830aF and 830bF, and the first and second rear-end intermediate pulleys 830aR and 830bR are movable in the winding direction of the first and second belts 84a and 84b, i.e., in the longitudinal direction of the second arm 7.

On the other hand, the hand unit 4 installed in the tip end portion of the second arm 7 is kept fixed. Accordingly, the tensions of the first and second belts 84a and 84b can be easily adjusted by sequentially moving the first and second rear-end intermediate pulleys 830aR and 830bR, the first and second front-end intermediate pulleys 830aF and 830bF, and the first and second motors 9a and 9b.

As can be appreciated from FIGS. 4A, 4B, 6A and 6B, the first and second intermediate power-transmitting belts 84aM and 84bM are larger in width than the first and second front-end power-transmitting belts 84aF and 84bF. The first and second rear-end power-transmitting belts 84aR and 84bR are larger in width than the first and second intermediate power-transmitting belts 84aM and 84bM.

In other words, the belt width are gradually increased from the first and second motors 9a and 9b toward the first and second driven pulleys 82a and 82b at which side the torque grows larger, thereby increasing the strength of the belts. This makes it possible to prevent disconnection or breakage of the belts in advance.

As shown in FIG. 3, a cable handling space 10 for accommodating a cable winding mechanism (not shown) is provided between the hand drive mechanism 8 and the upper surface of the arm housing 70. The second cable 11b extending from the second hand 4b is introduced into the cable handling space 10. The first cable 11a extending from the first hand 4a extends toward the first arm 6 through the inside of the first hand pivot shaft 1031 having a tubular shape.

Another Embodiment

Figure 7:
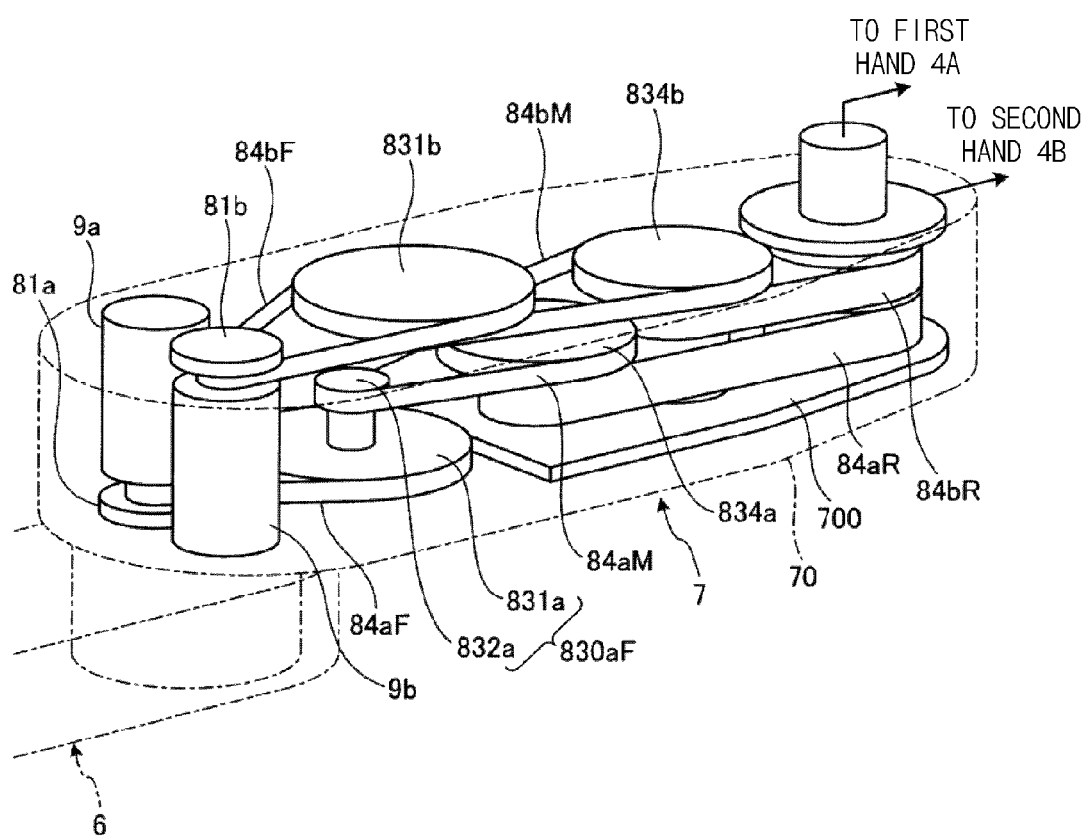
FIG. 7 is a schematic explanatory perspective view showing an arm of a robot according to another embodiment.
Figure 8A:
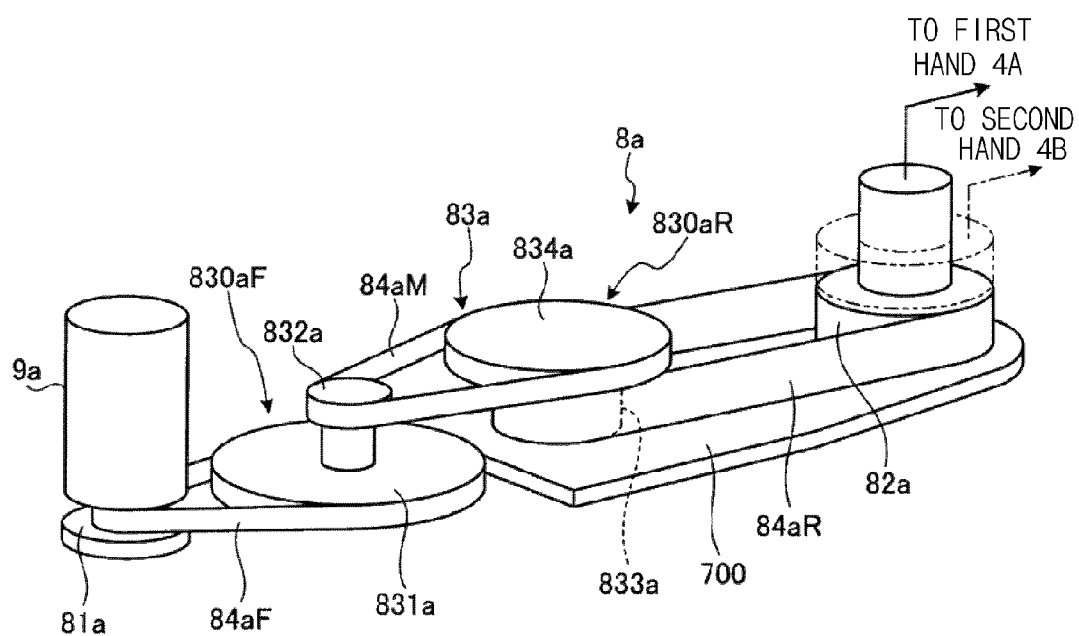
FIG. 8A is a schematic explanatory perspective view showing a first drive mechanism of the arm of the robot.
Figure 8B:
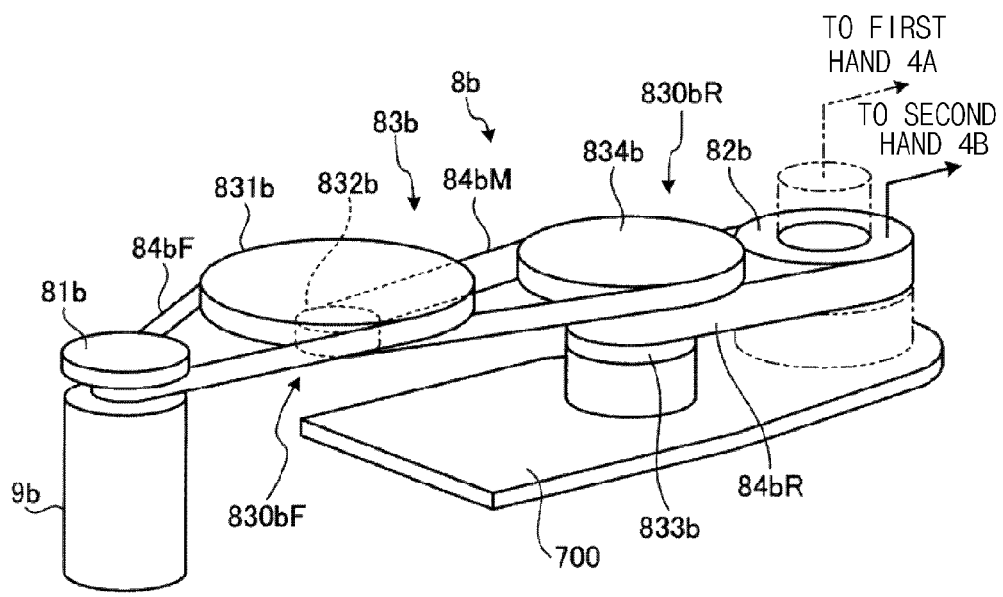
FIG. 8B is a schematic explanatory perspective view showing a second drive mechanism of the arm of the robot.

Next, a hand drive mechanism 8 of a robot 1 according to another embodiment will be described with reference to FIGS. 7, 8A and 8B. FIG. 7 is a schematic explanatory perspective view showing an arm of the robot 1 according to another embodiment. FIG. 8A is a schematic explanatory perspective view showing a first drive mechanism of the arm of the robot 1. FIG. 8B is a schematic explanatory perspective view showing a second drive mechanism of the arm of the robot 1.

In the following description, the components having the same functions as in the foregoing embodiment will be designated by like reference symbols. The configurations differing from those of the foregoing embodiment will be described. The remaining configurations will not be described in detail.

As can be seen in FIG. 7, the present embodiment differs from the foregoing embodiment in terms of two points.

(1) The first motor 9a and the second motor 9b are arranged within the second arm 7 such that the respective drive shafts (the first drive shaft 91a and the second drive shaft 91b) thereof protrude in the opposite directions.

(2) The first front-end intermediate pulley 830aF and the second front-end intermediate pulley 830bF are arranged in the opposite vertical orientations. The first driving intermediate pulley 831a of the first front-end intermediate pulley 830aF and the second driving intermediate pulley 831b of the second front-end intermediate pulley 830bF are arranged to partially overlap with each other when seen in a plan view.

In the hand drive mechanism 8 of the present embodiment, as shown in FIG. 8A, the first front-end intermediate pulley 830aF of the first intermediate pulley 83a includes a first driving intermediate pulley 831a operatively connected to the first driving pulley 81a through the first front-end power-transmitting belt 84aF. The first front-end intermediate pulley 830aF further includes a first driving sub-pulley 832a having a diameter smaller than the diameter of the first driving intermediate pulley 831a. The first driving sub-pulley 832a and the first driving intermediate pulley 831a are installed on the same shaft.

The first rear-end intermediate pulley 830aR of the first intermediate pulley 83a includes a first driven sub-pulley 834a operatively connected to the first driving sub-pulley 832a of the first front-end intermediate pulley 830aF through a first intermediate power-transmitting belt 84aM. The first rear-end intermediate pulley 830aR further includes a first driven intermediate pulley 833a having a diameter smaller than the diameter of the first driven sub-pulley 834a. The first driven intermediate pulley 833a and the first driven sub-pulley 834a are installed on the same shaft and the first driven intermediate pulley 833a is operatively connected to the first driven pulley 82a through a first rear-end power-transmitting belt 84aR.

As shown in FIG. 8B, the second front-end intermediate pulley 830bF of the second intermediate pulley 83b includes a second driving intermediate pulley 831b operatively connected to the second driving pulley 81b through a second front-end power-transmitting belt 84bF. The second front-end intermediate pulley 830bF further includes a second driving sub-pulley 832b having a diameter smaller than the diameter of the second driving intermediate pulley 831b. The second driving sub-pulley 832b and the second driving intermediate pulley 831b are installed on the same shaft.

The second rear-end intermediate pulley 830bR of the second intermediate pulley 83b includes a second driven sub-pulley 834b operatively connected to the second driving sub-pulley 832b of the second front-end intermediate pulley 830bF through a second intermediate power-transmitting belt 84bM. The second rear-end intermediate pulley 830bR further includes a second driven intermediate pulley 833b having a diameter smaller than the diameter of the second driven sub-pulley 834b. The second driven intermediate pulley 833b is installed on the shaft of the second driven sub-pulley 834b and is operatively connected to the second driven pulley 82b through a second rear-end power-transmitting belt 84bR. In FIGS. 7, 8A and 8B, reference symbol 700 designates a base plate on which the hand drive mechanism 8 is arranged.

In the hand drive mechanism 8 of the present embodiment described above, the first motor 9a and the second motor 9b are arranged in the opposite orientations. The first front-end intermediate pulley 830aF and the second front-end intermediate pulley 830bF are arranged in the opposite orientations. The first driving intermediate pulley 831a and the second driving intermediate pulley 831b are arranged to partially overlap with each other when seen in a plan view.

In the hand drive mechanism 8 completely accommodated within the second arm 7, it is not necessary to employ a speed reduction device including a heavy gear mechanism. This assists in reducing the weight of the second arm 7.

In the hand drive mechanism 8 of the present embodiment, the first driving pulley 81a and the second driving pulley 81b arranged in the opposite orientations can be operatively connected, with no hindrance, to the first driven pulley 82a and the second driven pulley 82b by virtue of the first intermediate pulley 83a, the second intermediate pulley 83b, the horizontally-wound first belts 84a and the horizontally-wound second belts 84b.

As described above in respect of the embodiments, the robot 1 is configured to include the second arm 7, the base end portion of which is rotatably installed through the arm support shaft. The hand pivot shaft 103 as an output shaft is installed in the tip end portion of the second arm 7. The hand drive mechanism 8 for driving the hand pivot shaft 103 at a reduced speed is arranged within the second arm 7.

However, the output shaft is not limited to the hand pivot shaft 103. Needless to say, the hand drive mechanism 8 may be of any other type as long as it can drive the output shaft. It goes without saying that the arm for accommodating the drive mechanism is not limited to the second arm 7.

With the configuration described above, it is possible for the robot 1 of the present embodiment to reduce the weight of the arm.

Other effects and other modified examples can be readily derived by those skilled in the art. For that reason, the broad aspect of the present disclosure is not limited to the specific disclosure and the representative embodiments shown and described above. Accordingly, the present disclosure can be modified in many different forms without departing from the spirit and scope defined by the appended claims and the equivalents thereof.

What is claimed is:

1. A robot, comprising:
   an arm having a base end portion rotatably installed through a joint part and a tip end portion in which one or more hand pivot shafts configured to rotatably support a hand unit are installed; and
   one or more drive mechanisms, each being arranged within the arm and configured to drive the hand pivot shaft at a reduced speed,
   wherein each drive mechanism includes a motor having a motor shaft, a driving pulley attached to the motor shaft, a driven pulley attached to a hand pivot shaft, an intermediate pulley unit provided between the driving pulley and the driven pulley, and a plurality of belts for operatively interconnecting the driving pulley and the driven pulley through the intermediate pulley unit,
   wherein the intermediate pulley unit includes:
      a front-end intermediate pulley including a driving intermediate pulley operatively connected to the driving pulley through a first belt among the plurality of belts and a driving sub-pulley attached to a shaft to which the driving intermediate pulley is attached; and
      a rear-end intermediate pulley including a driven intermediate pulley operatively connected to the driven pulley through a second belt among the plurality of belts, and a driven sub-pulley attached to a shaft to which the driven intermediate pulley is attached, the driven sub-pulley being operatively connected to the driving sub-pulley of the front-end intermediate pulley through a third belt among the plurality of belts, and
   wherein the third belt is larger in width than the first belt, the second belt being larger in width than the third belt.

2. The robot of claim 1, wherein the hand unit includes a plurality of hands arranged in a spaced-apart relationship along a pivot axis of the hands.

3. The robot of claim 2, wherein said one or more hand pivot shafts include a first hand pivot shaft and a second hand pivot shaft,
   wherein the hands include a first hand attached to the first hand pivot shaft and a second hand attached to the second hand pivot shaft,
   wherein said one or more drive mechanisms include a first drive mechanism corresponding to the first hand and a second drive mechanism corresponding to the second hand,
   wherein the first drive mechanism includes a first motor, a first driving pulley, attached to a drive shaft of the first motor, a first driven pulley having a specified speed reduction ratio and attached to the first hand pivot shaft and a first intermediate pulley unit having a specified speed reduction ratio and installed between the first driving pulley and the first driven pulley;
   wherein the second drive mechanism includes a second motor, a second driving pulley attached to a drive shaft of the second motor, a second driven pulley having a specified speed reduction ratio and attached to the second hand pivot shaft and a second intermediate pulley unit having a specified speed reduction ratio and installed between the second driving pulley and the second driven pulley,
   wherein the second hand pivot shaft is formed into a tubular shape, the first hand pivot shaft being inserted into the second hand pivot shaft, the first hand pivot shaft and the second hand pivot shaft being configured to have a common center axis, and
   wherein the first motor and the second motor are arranged side by side in a transverse direction of the arm.

4. The robot of claim 3, wherein the arm includes:
   a first arm having a base end portion rotatably connected to a base unit through a first joint part, the base unit being installed on an installation surface; and
   a second arm having a base end portion rotatably connected to a tip end portion of the first arm through a second joint part, the second arm having a tip end portion to which the hands are rotatably connected through the hand pivot shaft, the first drive mechanism and the second drive mechanism being arranged within the second arm.

5. The robot of claim 4, wherein the first intermediate pulley unit includes: a first front-end intermediate pulley having a first driving intermediate pulley operatively connected to the first driving pulley through a first front-end power-transmitting belt and a first driving sub-pulley attached to a shaft to which the first driving intermediate pulley is attached, and a first rear-end intermediate pulley having a first driven sub-pulley operatively connected to the first driving sub-pulley of the first front-end intermediate pulley through a first intermediate power-transmitting belt and a first driven intermediate pulley operatively connected to the first driven pulley through a first rear-end power-transmitting belt, the first driven intermediate pulley being attached to a shaft to which the first driven sub-pulley is attached,
   wherein the second intermediate pulley unit includes: a second front-end intermediate pulley having a second driving intermediate pulley operatively connected to the second driving pulley through a second front-end power-transmitting belt and a second driving sub-pulley attached to a shaft to which the second driving intermediate pulley is attached, and a second rear-end intermediate pulley having a second driven sub-pulley operatively connected to the second driving sub-pulley of the second front-end intermediate pulley through a second intermediate power-transmitting belt and a second driven intermediate pulley operatively connected to the second driven pulley through a second rear-end power-transmitting belt, the second driven intermediate pulley being attached to a shaft to which the second driven sub-pulley is attached, wherein the first driving intermediate pulley of the first front-end intermediate pulley and the second driving intermediate pulley of the second front-end intermediate pulley are arranged at a same height, wherein the first rear-end intermediate pulley and the second rear-end intermediate pulley are arranged in opposite vertical orientations, the first driven sub-pulley and the second driven sub-pulley being arranged to partially overlap with each other when seen in a plan view, and wherein at least base end portions of the first motor and the second motor are arranged within the first arm.

6. The robot of claim 4, wherein the first intermediate pulley unit includes: a first front-end intermediate pulley having a first driving intermediate pulley operatively connected to the first driving pulley through a first front-end power-transmitting belt and a first driving sub-pulley attached to a shaft to which the first driving intermediate pulley is attached, and a first rear-end intermediate pulley having a first driven sub-pulley operatively connected to the first driving sub-pulley of the first front-end intermediate pulley through a first intermediate power-transmitting belt and a first driven intermediate pulley operatively connected to the first driven pulley through a first rear-end power-transmitting belt, the first driven intermediate pulley being attached to a shaft to which the first driven sub-pulley is attached, wherein the second intermediate pulley unit includes: a second front-end intermediate pulley having a second driving intermediate pulley operatively connected to the second driving pulley through a second front-end power-transmitting belt and a second driving sub-pulley attached to a shaft to which the second driving intermediate pulley is attached, and a second rear-end intermediate pulley having a second driven sub-pulley operatively connected to the second driving sub-pulley of the second front-end intermediate pulley through a second intermediate power-transmitting belt and a second driven intermediate pulley operatively connected to the second driven pulley through a second rear-end power-transmitting belt, the second driven intermediate pulley being attached to a shaft to which the second driven sub-pulley is attached, wherein the first motor and the second motor are arranged within the second arm and provided with drive shafts protruding in opposite directions, and wherein the first front-end intermediate pulley and the second front-end intermediate pulley are arranged in opposite vertical orientations, the first driving intermediate pulley and the second driving intermediate pulley being arranged to partially overlap with each other when seen in a plan view.

7. The robot of claim 1, wherein the driving intermediate pulley and the driving sub-pulley of the front-end intermediate pulley are arranged on the same shaft in an overlapping relationship between a first base plate and a first support plate connected to the first base plate through a first connecting member, and wherein the driven intermediate pulley and the driven sub-pulley of the rear-end intermediate pulley are arranged on the same shaft in an overlapping relationship between a second base plate and a second support plate connected to the second base plate through a second connecting member.

8. The robot of claim 1, wherein the motor having the motor shaft to which the driving pulley is attached, the front-end intermediate pulley and the rear-end intermediate pulley are movably attached in a belt winding direction so that the tensions of the belts can be adjusted by moving the rear-end intermediate pulley, the front-end intermediate pulley and the motor.

* * * * *